United States Patent

Liu et al.

[11] Patent Number: 5,878,496
[45] Date of Patent: Mar. 9, 1999

[54] METHOD OF MANUFACTURING A COMPONENT

[75] Inventors: Chunghorng R. Liu, West Lafayette, Ind.; Shridhar Mittal, Plano, Tex.

[73] Assignee: Purdue Research Foundation, West Lafayette, Ind.

[21] Appl. No.: 631,686

[22] Filed: Apr. 9, 1996

[51] Int. Cl.$^6$ ...................................................... B23P 15/00
[52] U.S. Cl. .................. 29/898.066; 29/404; 29/407.08; 29/407.01; 148/906
[58] Field of Search ............................... 29/898.066, 404, 29/407.01, 407.08, 557, 558, 898.09, 898.13; 148/316, 318, 906

[56] References Cited

U.S. PATENT DOCUMENTS

| | | | |
|---|---|---|---|
| 1,498,748 | 6/1924 | Pierce, Jr. | |
| 2,370,173 | 2/1945 | Kendall | 308/195 |
| 2,983,030 | 5/1961 | Spicacci | 29/148.4 |
| 3,332,728 | 7/1967 | Gibson | 308/193 |
| 3,378,903 | 4/1968 | Cardillo | 29/148.4 |
| 3,693,226 | 9/1972 | Howe, Jr. | 29/148.4 R |
| 3,714,694 | 2/1973 | Dobson | 29/148.4 R |
| 3,769,671 | 11/1973 | Knapp | 29/148.4 R |
| 3,773,565 | 11/1973 | Pye et al. | 148/1 |
| 4,393,563 | 7/1983 | Smith | 29/149.5 |
| 4,435,890 | 3/1984 | Ernst et al. | 29/148.4 |
| 4,509,803 | 4/1985 | Takenaka et al. | 308/5 |
| 4,541,157 | 9/1985 | Tsushima et al. | 29/149.5 |
| 4,611,373 | 9/1986 | Hazelbrook | 29/148.4 |
| 4,644,702 | 2/1987 | Teramachi | 51/291 |
| 4,696,083 | 9/1987 | Olschewski et al. | 29/148.4 |

*Primary Examiner*—Larry I. Schwartz
*Assistant Examiner*—Marc W. Butler
*Attorney, Agent, or Firm*—Gary M. Hartman; Domenica N. S. Hartman

[57] ABSTRACT

A process for manufacturing a component on which in-service stresses are imposed by in-service loading conditions. The process generally entails fabricating the component such that residual stresses are induced in the component that substantially offset one or more primary stresses which would otherwise limit the maximum service life of the component. The residual stresses are induced by creating compressive stresses in the component that extend sufficiently beneath the working surface of the component during fabrication. In order to appropriately attain the necessary residual stresses, the process of this invention includes developing a model of the component, and then applying the in-service loading conditions to the model to determine the in-service stresses on the component. Thereafter, at least one of the in-service stresses is identified as being critical, i.e., a stress that establishes the maximum service life of the component. Finally, the component is fabricated such that necessary residual stresses are induced in the component in order to offset the identified critical stress.

21 Claims, 3 Drawing Sheets

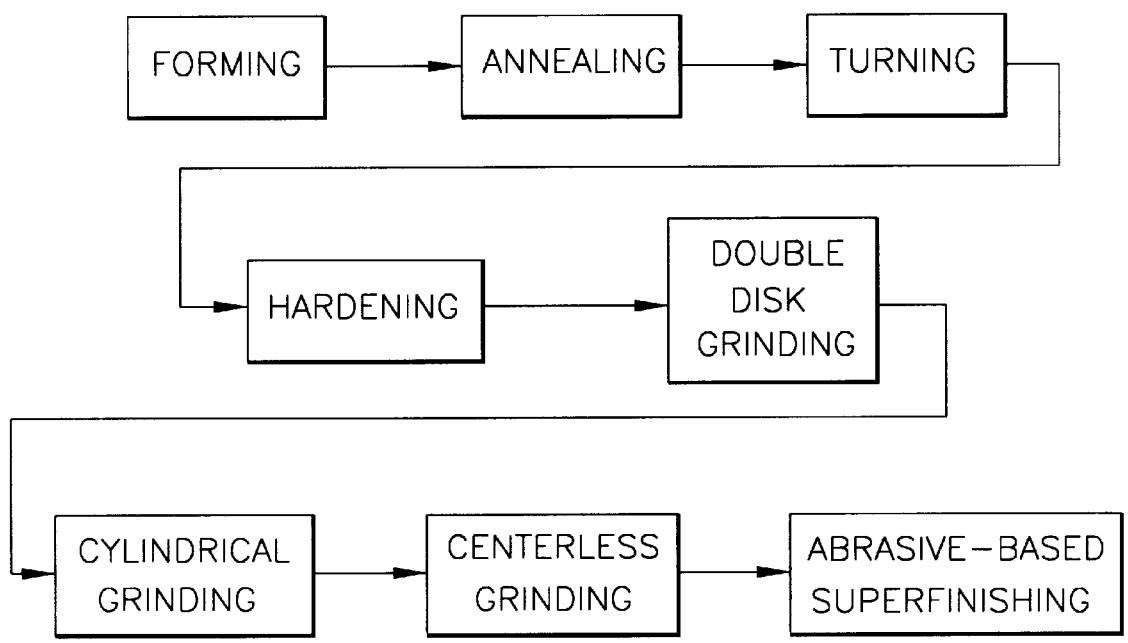
FIG.1
FIG.2
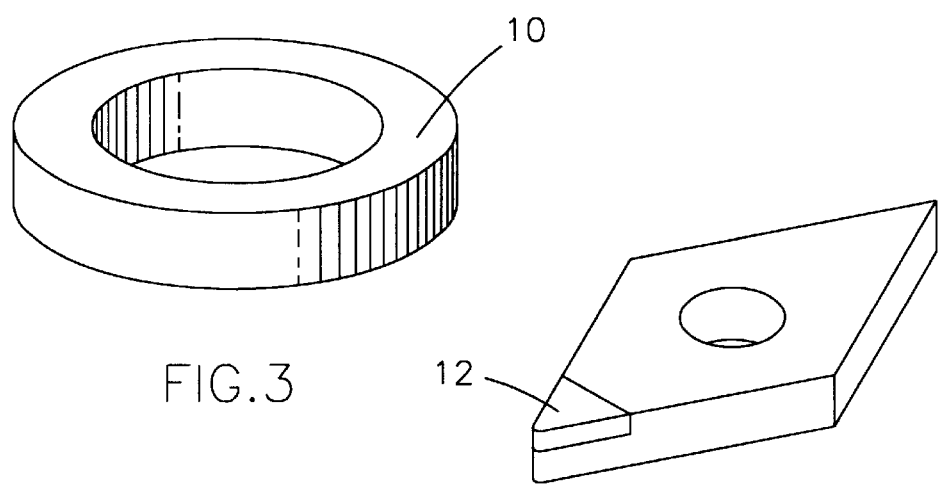
FIG.3
FIG.4a

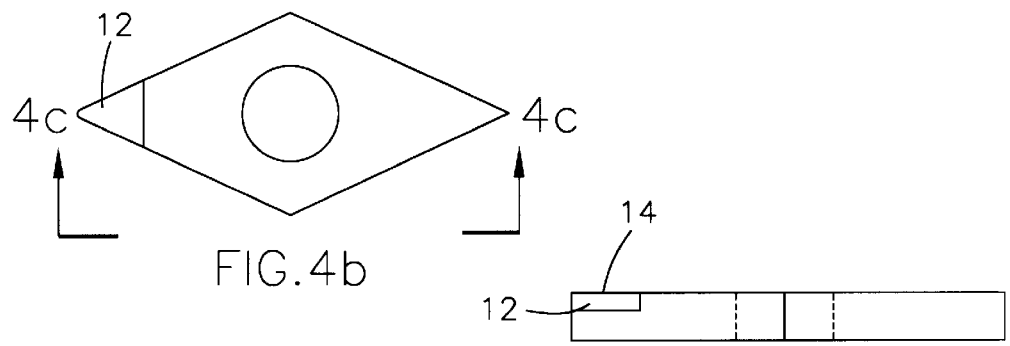
FIG.4b
FIG.4c
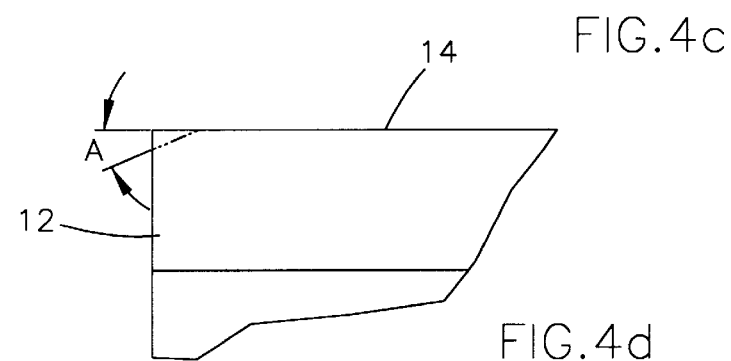
FIG.4d
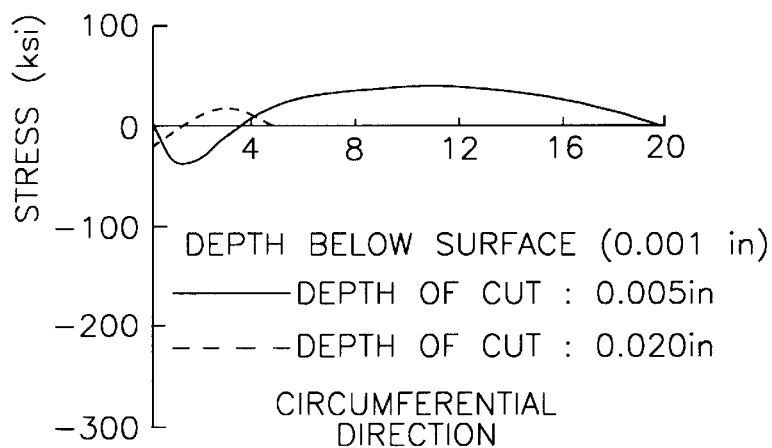
FIG.5a
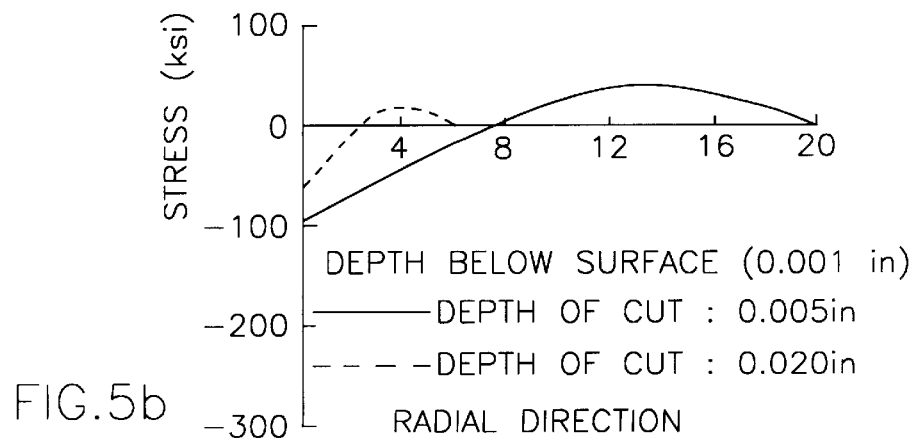
FIG.5b

METHOD OF MANUFACTURING A COMPONENT

BACKGROUND OF THE INVENTION

1. Field of the Invention

The present invention generally relates to methods and process sequences employed in the manufacture of components. More particularly, this invention relates to a manufacturing method which entails selecting optimal processing conditions by which residual stresses are created in a component at sufficient levels to offset service stresses imposed on the component, such that optimal service life is achieved for the component.

2. Description of the Prior Art

A major inefficiency in the manufacturing of hardened, high precision components is the number of processes or steps necessary to finish the component. As an example, the current method of producing the surface of a bearing race involves forming, annealing, rough turning, hardening, several types of grinding and, finally, abrasive-based superfinishing, as illustrated by FIG. 1. An additional setup is required for each process, with occasional inspections being necessary between processes. Therefore, there is a considerable economic motivation to extend one process or machine tool's capability so that other processes in the production sequence can be eliminated, thus reducing setup times and the complexity of the manufacturing schedule, and gaining significant benefits for flexibility and system efficiency.

The difficulty with which the above benefits are achieved is complicated by the service requirements of a component. Components such as bearing races are often subject to severe in-service stresses that may cause premature failure of the component. A major factor determining the service life of a component is surface integrity, which the industry defines as the result of alterations produced in a surface layer during manufacture of the component and which affect the material properties and performance of the component's surface in service. Typically, three factors are considered for surface integrity: surface finish, microstructure and residual stress. The prior art has long given considerable attention to a component's surface finish and physical and material properties in order to meet design requirements such as strength, fatigue and wear, with finish grinding, honing, lapping, polishing, electropolishing and abrasive superfinishing techniques used to readily achieve surface finishes of 16 microinches Ra and less for components that require a polished finish or superfinish. However, because the shape and orientation of the abrasive particles used in finish grinding and other finishing techniques cannot be controlled, material removal by such techniques likewise cannot be controlled in a manner that will predictably and controllably alter certain surface integrity characteristics, such as residual stresses in the surface. Consequently, the prior art has conventionally relied on additional processing steps, such as shot peening, to improve residual stresses in a component.

Research directed specifically to surface integrity has generated more interest of late, particularly with respect to the effect that certain fabrication practices may have on the microstructure and residual stresses of a component. However, improvements in one surface integrity characteristic have generally been achieved at the expense of others. The prior art has been successful in producing machined surfaces characterized by enhanced surface integrity in terms of minimal effects on microstructure and identifying certain machining parameters that affect residual stresses. However, such efforts have been limited to minimum surface finishes of 32 microinches (0.81 micrometer) Ra, which is inadequate for many applications such as bearing races. Furthermore, the prior art has not succeeded in identifying and selecting processing variables that could specifically enhance the service life of a component based on its particular service environment.

Thus, it would be desirable to provide a method for improving the service life of a component through optimizing fabrication parameters based on intended service loads, including improvements in surface integrity and finish of a component. Ideally, such a method would also be achieved while reducing the number of processing steps necessary to finish the component, and thus reduce setup times and processing complexity.

SUMMARY OF THE INVENTION

It is an object of this invention to provide a process for manufacturing a component by which the surface integrity of the component is enhanced for its intended application.

It is a further object of this invention that such a process entails identifying those in-service stresses that limit the service life of the component, and then inducing an appropriate level of residual stresses within the component in order to offset the in-service stresses and thereby substantially optimize the component's service life.

It is still another object of this invention that such a process enables conventional steps of a component's manufacturing sequence, such as rough machining, grinding and superfinishing, to be eliminated or replaced so as to reduce the setup time and processing time and costs for the component.

It is yet another object of this invention that such a process can produce surface finishes comparable to that attainable with conventional finishing processes, such as finish grinding, honing, lapping, polishing, electropolishing and superfinishing.

In accordance with a preferred embodiment of this invention, these and other objects and advantages are accomplished as follows.

According to the present invention, there is provided a process for manufacturing a component on which in-service stresses are imposed by in-service loading conditions. The process generally entails fabricating the component such that residual stresses are induced in the component that substantially offset one or more in-service stresses which would otherwise limit the maximum service life of the component. More particularly, the residual stresses are induced in the component during fabrication, so as to be of sufficient magnitude and extend sufficiently beneath the working surface of the component to substantially offset the in-service stresses determined for the component. In order to ensure that the necessary residual stresses are appropriately attained, the process of this invention includes developing a model of the component, and then applying the in-service loading conditions to the model to determine the in-service stresses on the component. Thereafter, at least one of the in-service stresses is identified as being critical, i.e., a stress that establishes the maximum service life of the component. Finally, the component is fabricated such that necessary residual stresses are induced and distributed in the component in order to offset the identified critical stress.

According to this invention, fabrication parameters capable of achieving a particular surface finish and the required residual stress distribution in a given component are based on separate, determinable interrelationships. As such, this invention makes possible a technique for accurately predicting the surface finish and residual stress distribution for a component produced under a given combination of parameters through the steps of producing a number of specimens using different fabrication parameters, determining the surface finishes and residual stress distributions of the specimens, and then deriving experimental interrelationships between fabrication parameters and surface finish and residual stress. The fabricating step can be a machining or molding operation using various materials including metals, plastics, powder metallurgy and composite materials. As used herein, machining operations include facing, turning, milling, boring, broaching, drilling and similar type operations, in contradistinction to grinding, superfinishing and other traditional finishing operations that are conventionally employed as finishing operations to achieve surface finishes of 32 microinches Ra and less.

Broad ranges for potentially acceptable machining parameters are as follows: a cutting speed of about 100 to about 1000 surface feet per minute (sfpm) (about 30.5 to about 305 meters/minute), a feed rate of up to about 0.015 inch per revolution (ipr) (about 0.38 millimeter per revolution) and a minimum tool nose radius of about 0.8 millimeters (about 0.0315 inch) on a CBN (cubic boron nitride), diamond or ceramic cutting tool. Notably, machining parameters within the above-stated ranges are able to achieve surface finishes of 32 microinches Ra or less, such that finish grinding and superfinishing techniques are unnecessary. Furthermore, these machining parameters are successful with prehardened materials, such as Rc 35 and higher, such that the process of this invention also eliminates the prior art requirement to rough machine a component prior to hardening. As such, the process of this invention is able to reduce the manufacturing sequence to the steps of forming a component, hardening the component, and then machining the component. The resulting component is characterized by a surface finish that rivals that attainable with conventional grinding and superfinishing techniques, but is uniquely characterized by the presence of optimal residual stresses that extend below its surface well in excess of that possible with grinding and superfinishing, e.g., 0.001 inch (about 25 micrometers) and more below the surface.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 represents the manufacturing sequence for a rolling bearing race in accordance with the prior art;

FIG. 2 represents the manufacturing sequence for a rolling bearing race in accordance with a preferred embodiment of this invention;

FIG. 3 represents a rolling bearing race that can be manufactured by the process of FIG. 2;

FIGS. 4a through 4d illustrate a tool insert of a type used in the process of this invention;

FIGS. 5a and 5b graphically compare the affect that depth of cut has on residual stress distribution when hard turning a bearing race according to the fabrication process of this invention.

DETAILED DESCRIPTION OF THE PREFERRED EMBODIMENT

Figure 6A:
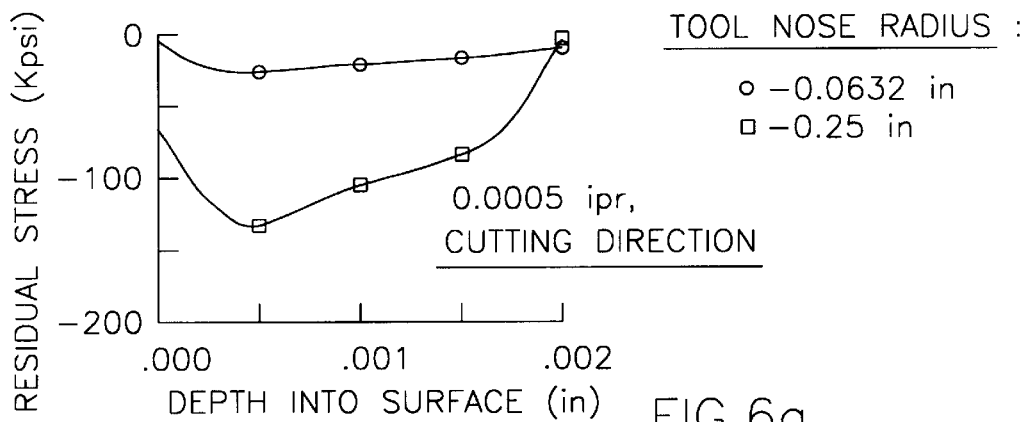
FIGS. 6a through 6d graphically compare the affect that tool nose radius and feed rate have on residual stress distribution when hard turning a bearing race according to the fabrication process of this invention.

A process is provided for manufacturing a component on which in-service stresses are imposed by in-service loading conditions. FIG. 2 represents the manufacturing sequence made possible by this invention, while FIG. 3 represents a bearing race 10 that is particularly well suited to benefit from the advantages of this invention. The invention is directed to optimally prestressing a component during manufacture in order to offset in-service stresses that will be imposed by the service loading to which the component will be subjected. In addition, this invention entails a process for determining optimal fabrication parameters to yield the desired prestresses, or residual stresses, within a component and, importantly, induce such residual stresses at appropriate levels and sufficiently below the surface of a component in order to significantly enhance the surface integrity of the component. While the invention is applicable to different manufacturing processes and materials, specific references will be made to the manufacture of the bearing race 10 from a hardened steel.

The process generally entails fabricating a component, such as the bearing race 10 of FIG. 3, such that a desired residual stress distribution is intentionally and controllably induced in the component at a desired depth below the surface of the component, to the extent that the residual stresses are able to substantially offset one or more "critical" in-service stresses, i.e., a stress that would otherwise be the first cause of failure in the component, and thereby directly limits the maximum service life of the component. Using the bearing race 10 as an example, a critical stress might be induced by the dynamic loading of the bearing surface of the race 10, leading to fatigue cracking of the race material. According to this invention, the desired residual stresses are compressive residual stresses that extend an optimum depth, up to about 50 percent of the depth of cut, beneath the working surface of the component, e.g., the bearing surface of the race 10. Under different conditions, such as where bending stresses predominate, the desired residual stresses may be tensile and/or shear stresses. This invention's capability to induce residual compressive, tensile and/or shear stresses well below the surface of a component is important in view of the tendency for maximum in-service stresses to be present below, and not at, the surface of heavily loaded components such as the bearing race 10 of FIG. 3.

While the manner in which these residual stresses are induced is critical, achieving an appropriate level of residual stresses in a given component is equally important, such that the residual stresses do not themselves lead to premature failure of the component. In other words, this invention is directed to inducing residual stresses in a component that offset, but do not overcompensate for a component's in-service stresses. For this purpose, the process of this invention includes developing a model of the component, and then applying the in-service loading conditions to the model to determine the level and location of in-service stresses on the component. According to the invention, the model can be a computer model or a physical specimen. Current technology available and known in the art enables in-service loading conditions to be applied analytically to a computer model, and analysis of critical stresses and fatigue life can be employed to quantify the desired residual stresses for a physical specimen. While the fabrication and modeling technologies employed by this invention are known, the combination of using a model to determine a desired residual stress distribution that will offset in-service stresses at a particular depth below the surface of a component, and then determining specific fabricating parameters to achieve the desired residual stress level and distribution in the component, is neither known nor has been suggested in the art.

Once the in-service stresses are determined, at least one is identified as being critical, i.e., a stress whose level and location in the component results in the stress being determined as the probable first cause of failure in the component. Such stresses often induce failure by fatigue, as discussed above for the race 10, though other potential failure modes are anticipated. Finally, the component is fabricated such that the necessary level and depth of residual stresses are induced in the component in order to offset the identified critical stress. According to this invention, the fabricating step can be a machining or molding operation using various materials, including metals, plastics, powder metallurgy and composites. In terms of molding operations, residual stresses can be in-molded by employing a multi-shot injection molding technique by which a first material is injected and cooled to form the surface of the component, and then injecting a second material beneath the first material such that, upon cooling, the second material will induce residual compressive stresses in the first material.

Fabrication techniques for inducing residual stresses by machining rely on the material removal parameters for the particular machining operation. According to this invention, suitable residual stresses are achieved when machining a prehardened component, such as the race 10 hardened to about 60 Rc or more. Specifically, significantly deeper and more favorable and consistent residual stresses have been created beneath the surface of a component if machining is performed directly on a hardened surface. Secondary benefits of this determination are that surface finishes have been achieved that are comparable to that achieved by abrasive-based superfinishing techniques, i.e., about 16 microinches (about 0.41 micrometer) Ra, and typically 8 microinches (about 0.20 micrometer) Ra and less, such that finish grinding and superfinishing techniques are unnecessary. Yet another benefit is that such residual stresses can be achieved without altering the microstructure of the hardened surface, such that the mechanical and wear properties sought by hardening the surface are not lost during machining.

According to this invention, machining parameters that achieve the above-identified benefits when performed directly on a hardened surface are as follows: a cutting speed of about 100 to about 1000 surface feet per minute (sfpm) (about 30.5 to about 305 meters/minute), a feed rate of up to about 0.015 inch per revolution (ipr) (about 0.38 millimeter), and a minimum nose radius of about 0.8 millimeters (about 0.0315 inch) on a CBN, diamond or ceramic cutting tool. For achieving a surface finish of about 8 microinches Ra or less, more preferred ranges are a cutting speed of about 200 to about 700 sfpm (about 61 to about 213.5 meters/minute), a feed rate of about 0.0005 to about 0.008 ipr (about 0.01 to about 0.20 millimeter), and a depth of cut of less than about 0.030 inch (about 0.76 millimeter). Determination of the appropriate machining parameters within these ranges entails the fabrication of a number of specimens using various combinations of machining parameters within these ranges, and then modeling the interrelationship of the parameters with separate equations for surface finish and integrity. According to this invention, the surface finish interrelationship is based on the following equation:

$$R_a = K V^m D^n F^p R_n^q \qquad \text{Equation A}$$

where $R_a$ is average surface finish, V is cutting speed, F is feed rate, D is depth of cut, $R_n$ is nose radius of the cutting tool, and K, m, n, p and q are constants determined experimentally from the machined specimens. Machining parameters in accordance with the above equation have simultaneously achieved surface finishes of 16 microinches Ra and less on hardened materials, such as Rc 35 and higher, such that the process of this invention also eliminates the prior art requirement to rough machine a component prior to hardening. As such, the process of this invention is able to reduce the manufacturing sequence to the steps of forming a component, hardening the component, and then machining the component, as represented by FIG. 2. Notably, materials that can be machined according to the above-noted equations include hardened medium and high carbon steels, alloy steels such as bearing steels and high speed steels, stainless steels, titanium-based alloys and other hard materials.

A component manufactured according to this invention must be uniquely characterized by the presence of optimal residual stresses that extend at least about 0.001 inch (about 25 micrometers) below its surface, which is well in excess of that possible with grinding and superfinishing techniques. The present invention realizes a broad range of residual stress distribution, both in magnitude and depth, that can be produced by using different cutting conditions during hard turning. As with surface finish, determination of the appropriate machining parameters to attain a required residual stress distribution in a particular component entails a process including the fabrication of a number of specimens using various combinations of machining parameters, determining the residual stress distribution through such methods as x-ray diffraction, and then analytically modeling the interrelationship of the resulting residual stresses and the machining parameters. This invention has accordingly developed the following equations capable of predicting residual stress distributions as functions of cutting parameters.

$$\ln(RS_c) = (k + m_1 v + n_1 f + p_1 d + q_1 df + r_1 vf + s_1 vd) + \qquad \text{Eq. B(1)}$$
$$(t_1 R_n + u_1 R_n v + w_1 R_n f + x_1 R_n d) +$$
$$((k_2 + m_2 v + n_2 f + p_2 d + q_2 df + r_2 vf + s_2 vd) +$$
$$(t_2 R_n + u_2 R_n v + w_2 R_n f + x_2 R_n d))\ln(z) +$$
$$((k_3 + m_3 v + n_3 f + p_3 d + q_3 df + r_3 vf + s_3 vd) +$$
$$(t_3 R_n + u_3 R_n v + w_3 R_n f + x_3 R_n d))\ln(z)^2 +$$
$$((k_4 + m_4 v + n_4 f + p_4 d + q_4 df + r_4 vf + s_4 vd) +$$
$$(t_4 R_n + u_4 R_n v + w_4 R_n f + x_4 R_n d))\ln(z)^3 +$$
$$((k_5 + m_5 v + n_5 f + p_5 d + q_5 df + r_5 vf + s_5 vd) +$$
$$(t_5 R_n + u_5 R_n v + w_5 R_n f + x_5 R_n d))\ln(z)^4 +$$
$$((k_6 + m_6 v + n_6 f + p_6 d + q_6 df + r_6 vf + s_6 vd) +$$
$$(t_6 R_n + u_6 R_n v + w_6 R_n f + x_6 R_n d))\ln(z)^5$$

$$\ln(RS_r) = (k_7 + m_7 v + n_7 f + p_7 d + q_7 df + r_7 vf + s_7 vd) + \qquad \text{Eq. B(2)}$$
$$(t_7 R_n + u_7 R_n v + w_7 R_n f + x_7 R_n d) +$$
$$((k_8 + m_8 v + n_8 f + p_8 d + q_8 df + r_8 vf + s_8 vd) +$$
$$(t_8 R_n + u_8 R_n v + w_8 R_n f + x_8 R_n d))\ln(z) +$$
$$((k_9 + m_9 v + n_9 f + p_9 d + q_9 df + r_9 vf + s_9 vd) +$$

-continued $(t_9R_n + u_9R_nv + w_9R_nf + x_9R_nd))\ln(z)^2 +$ $((k_{10} + m_{10}v + n_{10}f + p_{10}d + q_{10}df + r_{10}vf + s_{10}vd) +$ $(t_{10}R_n + u_{10}R_nv + w_{10}R_nf + x_{10}R_nd))\ln(z)^3 +$ $((k_{11} + m_{11}v + n_{11}f + p_{11}d + q_{11}df + r_{11}vf + s_{11}vd) +$ $(t_{11}R_n + u_{11}R_nv + w_{11}R_nf + x_{11}R_nd))\ln(z)^4 +$ $((k_{12} + m_{12}v + n_{12}f + p_{12}d + q_{12}df + r_{12}vf + s_{12}vd) +$ $(t_{12}R_n + u_{12}R_nv + w_{12}R_nf + x_{12}R_nd))\ln(z)^5$ where:

$RS_c$ is the residual stress level in the circumferential direction (the direction the cutting tool follows across the machined surface);

$RS_r$ is the residual stress level in the radial (feed) direction;

z is the depth below the surface in ten thousandths (0.0001) inch;

$v = 1 + 2(\ln(V) - \ln(V_{max}))/(\ln(V_{max}) - \ln(V_{min}))$;
$f = 1 + 2(\ln(F) - \ln(F_{max}))/(\ln(F_{max}) - \ln(F_{min}))$;
$d = 1 + 2(\ln(D) - \ln(D_{max}))/(\ln(D_{max}) - \ln(D_{min}))$;
$R_n = 1 + 2(\ln(N) - \ln(N_{max}))/(\ln(N_{max}) - \ln(N_{min}))$;

$R_n$ is the tool nose radius;

V, F, D and N are cutting speed, feed rate, depth of cut and tool nose radius, respectively;

$V_{max}$, $F_{max}$, $D_{max}$ and $N_{max}$ are the maximum cutting speed, feed rate, depth of cut and tool nose radius, respectively, employed to develop the equations;

$V_{min}$, $F_{min}$, $D_{min}$ and $N_{min}$ are the minimum cutting speed, feed rate, depth of cut and tool nose radius, respectively, employed to develop the equations; and $k_x$, $m_x$, $n_x$, $P_x$, $q_x$, $r_x$, $s_x$, $t_x$, $u_x$, $w_x$ and $x_x$ are the constants solved for to develop the equations.

According to this invention, it has been determined that different combinations of machining parameters can produce components having identical surface finishes (pursuant to Equation A), yet the components may be characterized by widely different residual stress distributions, such that one component can exhibit a much longer fatigue life than the other. As a specific example, two identical bearing races were produced from AISI 52100 bearing steel using the following hard turning parameters:

|  | A | B |
|---|---|---|
| Tool Nose Radius (inches) | 0.0315 | 0.0315 |
| Cutting Speed (sfpm) | 650 | 400 |
| Feed Rate (ipr) | 0.001 | 0.0005 |
| Depth of Cut (inches) | 0.005 | 0.0133 |
| Surface Finish ($\mu$in) | 3.97 | 3.85 |

The machining parameters for both races were based on the machining of a number of specimens, the resultant surface finishes of these specimens being applied to Equation A to yield a model for predicting the surface finishes of the races A and B. Though races A and B had nearly identical surface finishes, the fatigue life of race A was 4.88 times (488 percent) greater than that of race B under identical in-service loads. The above emphasizes the importance of developing a model of a component using Equations B(1) and B(2) in order to accurately predict the residual stress distribution resulting from given machining parameters. In doing so, considerable fatigue life improvements can be achieved for a wide variety of load-bearing components, such as cam shafts, gears, transmission shafts, and other components subjected to rolling contact, sliding contact and other modes of load application in service.

Residual stress distributions created through the use of machining parameters in accordance with this invention are represented by FIGS. 5a and 5b, which illustrate radial and circumferential residual stresses that were created in hardened (64 Rc) AMSI 52100 bearing steel races similar to the race 10 shown in FIG. 3. The bearing surfaces of the races were machined by a turning operation that employed a CBN tool having a nose radius of about 0.0315 inch (about 0.8 millimeter), using a feed rate of about 0.0005 ipr (about 0.01 millimeter per revolution), a cutting speed of about 650 sfpm (about 198 meters/minute) and a depth of cut of either about 0.005 inch (about 0.13 millimeter) or about 0.020 inch (about 0.51 millimeter), as indicated in the Figures. These parameters are within the ranges stated previously and produced a surface finish of less than 8 microinches Ra, based on an Equation A model. According to this invention, the relative impact of radial and circumferential residual stresses on the service life of the bearing race 10 depends on the particular service stresses imposed on the race 10, as would be understood by those skilled in the art. Importantly, in terms of residual compressive stress level and depth, the results of both sets of machining conditions (i.e., depth of cut of 0.005" and 0.020") are better than possible with prior art grinding and finishing practices. Again, this invention entails developing a model for the bearing races based on Equations B(1) and B(2) to ensure that the depth and level of residual compressive stresses appropriately offset, but do not significantly overcompensate for, the in-service stresses imposed on the races. Therefore, the bearings represented by FIGS. 5a and 5b are optimized for different service loading conditions, which are accurately identifiable using the methodology of this invention.

A preferred embodiment of the present invention is to machine the race 10 using a CBN, diamond or ceramic material for the tool insert 12, an example of which is represented in FIGS. 4a through 4d. A preferred insert material is comparable to a superabrasive material under the name BZN 8100 and commercially available from General Electric Another preferred aspect of the tool insert 12 is that the tool geometry lacks a chamfer on the rake face 14. Notably, conventional practice is to use a chamfer (shown in phantom as "A" in FIG. 4d) on the rake face of a tool insert in order to promote the strength of the insert. However, in the present invention, a chamfer promotes surface burning and is believed to promote tempering of the hardened surface, causing the creation of undesirable softened microstructures or phase changes. To further avoid burning of the hardened component surface, a cooling medium, and particularly a cryogenic cooling medium such as solid carbon dioxide or liquid nitrogen, is preferably directed at the component during machining.

Figure 6B:
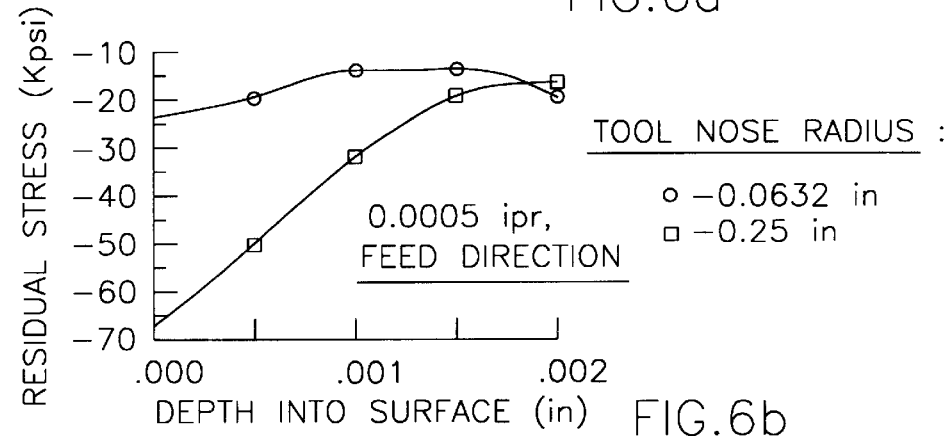
Figure 6C:
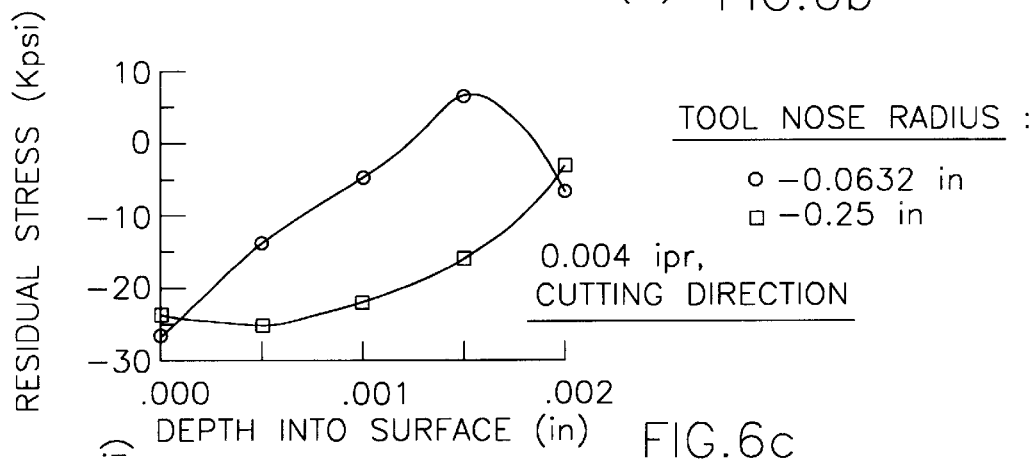
Figure 6D:
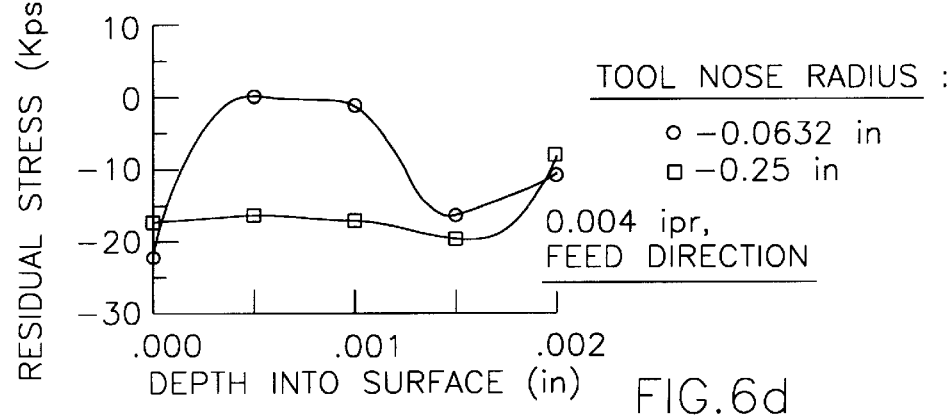

A surprising aspect of this invention is that the depth and magnitude of residual stresses appear to be functions of the tool nose radius "B," as evidenced by the results represented in FIGS. 6a through 6d. Specifically, FIG. 6a illustrates that, in the cutting direction, the maximum magnitude of the residual stress generated by a tool having a nose radius of about 0.25 inch (about 6.35 millimeters) is about three to five times larger than that possible with a tool having a nose radius of about 0.0632 inch (about 1.6 millimeters), while FIG. 6b illustrates that, in the feed direction, the residual stress generated by 0.25 inch tool is about 2.5 times larger than the stress generated by the 0.0632 inch tool. Similar results are illustrated by FIGS. 6c and 6d when using a higher feed rate of about 0.004 ipr (about 0.10 millimeter). Notably, conventional practice for hard machining is to use a tool having a nose radius as small as possible in order to promote stability and life of the tool.

As indicated in FIG. 2, the present invention is able to achieve the above while eliminating rough soft machining, grinding and superfinishing as manufacturing steps in the production of the bearing race 10 of FIG. 3. As such, the process of this invention is able to reduce the manufacturing sequence of the race 10 to the steps of forming the race 10, hardening the race 10 to a desired hardness, such as about 60 Rc and higher, and then machining the race 10, such as with a turning operation, according to the above equations for selecting machining parameters. The resulting bearing race 10 can be machined to have a surface finish of better than 16 microinches Ra, typically less then 8 microinches Ra, without altering the microstructure of the race material, while also having induced residual stresses into its bearing surface well in excess of that possible with grinding and superfinishing. These advantageous properties are achieved without annealing, rough turning, grinding and superfinishing the race 10, such that the setup time and the complexity of manufacturing scheduling are significantly reduced, while significant gains in flexibility and system efficiency are achieved.

It should also be noted that, although the advantages associated with the process of this invention have been explained with particular reference to a bearing race that is machined using a turning operation, it is within the capability of one skilled in the art to apply the present teachings to other machining techniques, such as facing, milling, boring, broaching, drilling and other related techniques for material removal. Furthermore, while improvements in fatigue have been discussed, improvements in wear can also be achieved through use of the same procedure. Finally, components having a wide variety of shapes can be produced by the process of this invention, including flat, cylindrical, compound and freeform three-dimensional surfaces of components such as molds, dies, cams, shafts, lead screws, components for nuclear reactors, and engine component surfaces.

Therefore, while the invention has been described in terms of a preferred embodiment, it is apparent that other forms could be adopted by one skilled in the art. Accordingly, the scope of our invention is to be limited only by the following claims.

The embodiments of the invention in which an exclusive property or privilege is claimed are defined as follows:

1. A process for manufacturing a component on which in-service stresses are imposed by in-service loading conditions, the process comprising the steps of:
    providing a model of the component;
    applying the in-service loading conditions to the model to determine the in-service stresses on the component; and
    machining the component using a tool insert having a minimum tool nose radius of about 0.0315 inch, a cutting speed of about 100 to about 1000 surface feet per minute, and a feed rate of up to about 0.015 inch per revolution, to intentionally prestress the component such that compressive residual stresses are induced in the component at a sufficient level and extend a sufficient depth beneath a surface of the component so as to substantially offset at least one of the in-service stresses and thereby increase the service life of the component.

2. The process of claim 1 wherein the tool insert lacks a chamfer on a rake face thereof.

3. The process of claim 1 wherein the model is a computer model.

4. The process of claim 1 wherein the model is a physical specimen.

5. The process of claim 1 wherein the machining step has parameters limited by the equation $$R_a = K V^m D^n F^p R_n^q$$

where $R_a$ is average surface finish, V is cutting speed, F is feed rate, D is depth of cut, $R_n$ is tool nose radius, and K, n, m, p and q are constants;
    the process further comprising the steps of machining a plurality of specimens of the component using different combinations of cutting speed, feed rate and depth of cut, and determining K, m, n, p and q based on the average surface finishes of the specimens, all of which is performed prior to the machining step.

6. The process of claim 1 wherein the machining step imparts a surface finish on the component of 32 microinches Ra or less.

7. The process of claim 1 further comprising the steps of:
    forming the component; and then
    hardening the component;
    prior to machining the component.

8. The component fabricated by the process of claim 1.

9. The process of claim 1 wherein a cooling medium is applied to the component at the tool insert during the machining operation.

10. The process of claim 1 wherein the component undergoes a finishing operation after the machining operation.

11. A process for manufacturing a component on which in-service stresses are imposed by in-service loading conditions, the process comprising the steps of:
    providing a model of the component;
    applying the in-service loading conditions on the model to determine the location and level of the in-service stresses on the component;
    identifying at least one of the in-service stresses as a critical stress that establishes a maximum service life of the component;
    machining a plurality of specimens of the component using different combinations of cutting speed, feed rate and depth of cut, the cutting speed being about 100 to about 1000 surface feet per minute, and the feed rate being up to about 0.015 inch per revolution;
    determining a first interrelationship between cutting speed, feed rate and depth of cut and the surface finish produced on the specimens, and determining a second interrelationship between cutting speed, feed rate and depth of cut and the residual stress distribution produced in the specimens; and then
    fabricating the component such that residual compressive stresses are created in the component that substantially offset the critical stress, the residual compressive stresses being created at a sufficient level and extend sufficiently beneath a surface of the component so as to offset the critical stress, the fabricating step comprising the steps of:

forming the component;

hardening the component to at least Rc 35; and then machining the component based on the first and second interrelationships so as to create the residual compressive stresses.

12. The process of claim 11 wherein the machining step is performed with a tool insert without a chamfer.

13. The process of claim 11 wherein the first interrelationship is characterized by the equation $$R_a = KV^m D^n F^p R_n^q$$

where $R_a$ is average surface finish, V is cutting speed, F is feed rate, D is depth of cut, $R_n$ is tool nose radius, and K, n, m, p and q are constants, the process further comprising the step of determining K, m, n, p and q based on the average surface finishes of the specimens.

14. The process of claim 13 wherein $R_a$ is a maximum of 16 microinches.

15. The process of claim 13 wherein $R_n$ is a minimum of 0.0315 inch.

16. The process of claim 11 wherein the second interrelationship is characterized by the equations:

$$\ln(RS_c) = (k_1 + m_1 v + n_1 f + p_1 d + q_1 df + r_1 vf + s_1 vd) +$$
$$(t_1 R_n + u_1 R_n v + w_1 R_n f + x_1 R_n d) +$$
$$((k_2 + m_2 v + n_2 f + p_2 d + q_2 df + r_2 vf + s_2 vd) +$$
$$(t_2 R_n + u_2 R_n v + w_2 R_n f + x_2 R_n d))\ln(z) +$$
$$((k_3 + m_3 v + n_3 f + p_3 d + q_3 df + r_3 vf + s_3 vd) +$$
$$(t_3 R_n + u_3 R_n v + w_3 R_n f + x_3 R_n d))\ln(z)^2 +$$
$$((k_4 + m_4 v + n_4 f + p_4 d + q_4 df + r_4 vf + s_4 vd) +$$
$$(t_4 R_n + u_4 R_n v + w_4 R_n f + x_4 R_n d))\ln(z)^3 +$$
$$((k_5 + m_5 v + n_5 f + p_5 d + q_5 df + r_5 vf + s_5 vd) +$$
$$(t_5 R_n + u_5 R_n v + w_5 R_n f + x_5 R_n d))\ln(z)^4 +$$
$$((k_6 + m_6 v + n_6 f + p_6 d + q_6 df + r_6 vf + s_6 vd) +$$
$$(t_6 R_n + u_6 R_n v + w_6 R_n f + x_6 R_n d))\ln(z)^5$$

$$\ln(RS_r) = (k_7 + m_7 v + n_7 f + p_7 d + q_7 df + r_7 vf + s_7 vd) +$$
$$(t_7 R_n + u_7 R_n v + w_7 R_n f + x_7 R_n d) +$$
$$((k_8 + m_8 v + n_8 f + p_8 d + q_8 df + r_8 vf + s_8 vd) +$$
$$(t_8 R_n + u_8 R_n v + w_8 R_n f + x_8 R_n d))\ln(z) +$$
$$((k_9 + m_9 v + n_9 f + p_9 d + q_9 df + r_9 vf + s_9 vd) +$$
$$(t_9 R_n + u_9 R_n v + w_9 R_n f + x_9 R_n d))\ln(z)^2 +$$
$$((k_{10} + m_{10} v + n_{10} f + p_{10} d + q_{10} df + r_{10} vf + s_{10} vd) +$$
$$(t_{10} R_n + u_{10} R_n v + w_{10} R_n f + x_{10} R_n d))\ln(z)^3 +$$
$$((k_{11} + m_{11} v + n_{11} f + p_{11} d + q_{11} df + r_{11} vf + s_{11} vd) +$$
$$(t_{11} R_n + u_{11} R_n v + w_{11} R_n f + x_{11} R_n d))\ln(z)^4 +$$
$$((k_{12} + m_{12} v + n_{12} f + p_{12} d + q_{12} df + r_{12} vf + s_{12} vd) +$$
$$(t_{12} R_n + u_{12} R_n v + w_{12} R_n f + x_{12} R_n d))\ln(z)^5$$

where:

$RS_c$ is the residual stress level in the circumferential direction;

$RS_r$ is the residual stress level in the radial direction;

z is the depth below the surface in ten thousandths inch;

$v = 1 + 2(\ln(V) - \ln(V_{max}))/(\ln(V_{max}) - \ln(V_{min}))$;

$f = 1 + 2(\ln(F) - \ln(F_{max}))/(\ln(F_{max}) - \ln(F_{min}))$;

$d = 1 + 2(\ln(D) - \ln(D_{max}))/(\ln(D_{max}) - \ln(D_{min}))$;

$R_n = 1 + 2(\ln(N) - \ln(N_{max}))/(\ln(N_{max}) - \ln(N_{min}))$;

$R_n$ is the tool nose radius;

V, F, D and N are cutting speed, feed rate, depth of cut and tool nose radius, respectively;

$V_{max}$, $F_{max}$, $D_{max}$ and $N_{max}$ are the maximum cutting speed, feed rate, depth of cut and tool nose radius, respectively, employed to develop the equations;

$V_{min}$, $F_{min}$, $D_{mmin}$, and $N_{min}$ are the minimum cutting speed, feed rate, depth of cut and tool nose radius, respectively, employed to develop the equations; and k, m, n, p, q, r, s, t, u, w and x are constants; the process further comprising the step of determining k, m, n, p, q, r, s, t, u, w and x based on residual stress distributions present in the specimens.

17. The component fabricated by the process of claim 11.

18. A process for manufacturing a bearing race on which in-service stresses are imposed by in-service loading conditions, the process comprising the steps of:

providing a model of the bearing race;

applying the in-service loading conditions on the model to determine the location and level of in-service stresses on the bearing race;

identifying at least one of the in-service stresses as a critical stress that establishes a maximum service life of the bearing race;

machining a plurality of specimens of the bearing race using different combinations of cutting speed, feed rate and depth of cut, the cutting speed being about 200 to about 700 surface feet per minute, and the feed rate being about 0.0005 to about 0.008 inch per revolution;

determining a first interrelationship between cutting speed, feed rate and depth of cut and the surface finish produced on the specimens, and determining a second interrelationship between cutting speed, feed rate and depth of cut and the residual stress distribution produced in the specimens; and then fabricating the bearing race such that residual compressive stresses are created in the bearing race that substantially offset the critical stress, the residual compressive stresses being created at a sufficient level and extending a sufficient depth beneath a bearing surface of the bearing race so as to offset the critical stress, the fabricating step consisting essentially of the steps of:

forming the bearing race;

hardening the bearing race to at least Rc 60; and then machining the bearing race so as to impart a surface finish on the bearing surface of the bearing race of 16 microinches Ra or less.

19. The process of claim 18 wherein the machining step is performed with a chamferless tool insert having a tool nose radius of at least about 0.25 inch.

20. The bearing race fabricated by the process of claim 18.

21. A process for manufacturing a bearing race, the process comprising the steps of:

machining at least one specimen of the bearing race using a chamferless tool insert having a minimum tool nose radius of about 0.0315 inch and using different combinations of cutting speed, feed rate and depth of cut to identify a combination that will produce a compressive residual stress beneath a surface of the bearing race that offsets an in-service stress beneath the surface, the cutting speed being about 100 to about 1000 surface feet per minute, and the feed rate being up to about 0.015 inch per revolution;

forming the bearing race;

hardening the bearing race to at least Rc 60; and then machining the bearing race with the chamferless tool insert using the identified combination of cutting speed, feed rate and depth of cut to induce the compressive residual stress beneath the surface of the bearing race so as to increase the service life of the bearing race, the machining step imparting a surface finish on the bearing surface of 16 microinches Ra or less.

* * * * *